US012561629B2

(12) United States Patent
Hoang et al.

(10) Patent No.: US 12,561,629 B2
(45) Date of Patent: Feb. 24, 2026

(54) IDENTIFYING REGULATORY DATA CORRESPONDING TO EXECUTABLE RULES

(71) Applicant: INTERNATIONAL BUSINESS MACHINES CORPORATION, Armonk, NY (US)

(72) Inventors: Thanh Lam Hoang, Maynooth (IE); Marco Luca Sbodio, Castaheany (IE); Vanessa Lopez Garcia, Dublin (IE); Natalia Mulligan, Dublin (IE); Yufang Hou, Dublin (IE); Gabriele Picco, Dublin (IE); Inge Lise Vejsbjerg, Dublin (IE); Joao H Bettencourt-Silva, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 17/649,183

(22) Filed: Jan. 27, 2022

(65) Prior Publication Data

US 2023/0237399 A1 Jul. 27, 2023

(51) Int. Cl.
| | |
|---|---|
| *G06F 40/295* | (2020.01) |
| *G06F 40/40* | (2020.01) |
| *G06Q 10/0631* | (2023.01) |
| *G06V 30/416* | (2022.01) |

(52) U.S. Cl.
CPC ..... *G06Q 10/06315* (2013.01); *G06F 40/295* (2020.01); *G06F 40/40* (2020.01); *G06V 30/416* (2022.01)

(58) Field of Classification Search
CPC . G06Q 10/06315; G06F 40/295; G06F 40/40; G06V 30/416
See application file for complete search history.

(56) References Cited

U.S. PATENT DOCUMENTS

| | | | |
|---|---|---|---|
| 10,672,092 B2 | 6/2020 | Simpson | |
| 11,556,938 B2 | 1/2023 | Nair et al. | |
| 2009/0198646 A1* | 8/2009 | Krishnamurthy | G06F 16/36 |
| | | | 707/E17.022 |
| 2018/0053128 A1* | 2/2018 | Costas | G06Q 50/18 |
| 2018/0137107 A1* | 5/2018 | Buccapatnam Tirumala | |
| | | | G06N 3/08 |
| 2020/0111023 A1* | 4/2020 | Pondicherry Murugappan | |
| | | | G06N 5/02 |

(Continued)

FOREIGN PATENT DOCUMENTS

| | | |
|---|---|---|
| CN | 109493265 A | 3/2019 |
| CN | 112800246 A | 5/2021 |

(Continued)

OTHER PUBLICATIONS

L. Elluri, S. et al., "A Bert Based Approach to Measure Web Services Policies Compliance With GDPR," in IEEE Access, vol. 9, pp. 148004-148016 (Year: 2021).*

(Continued)

*Primary Examiner* — Bhavesh M Mehta
*Assistant Examiner* — Nandini Subramani
(74) *Attorney, Agent, or Firm* — CHIP LAW GROUP

(57) ABSTRACT
Various embodiments are provided for correlating regulatory data in a computing environment by a processor. A rule may be associated with one or more textual paragraphs extracted from a policy document that describes at least a portion of the rule.

12 Claims, 9 Drawing Sheets

600

(56) References Cited

U.S. PATENT DOCUMENTS

| | | | | |
|---|---|---|---|---|
| 2021/0319173 | A1* | 10/2021 | Gerber, Jr. | G06F 16/31 |
| 2023/0214679 | A1* | 7/2023 | Xu | G06F 18/2113 |
| | | | | 706/47 |

FOREIGN PATENT DOCUMENTS

| | | | |
|---|---|---|---|
| CN | 113032552 A | 6/2021 |
| CN | 116502645 A | 7/2023 |
| JP | 2023109716 A | 8/2023 |
| WO | 2012/006509 A1 | 1/2012 |

OTHER PUBLICATIONS

T. Zhang, et. al., "A Text Mining based Method for Policy Recommendation," 2021 IEEE International Conference on Services Computing (SCC), Chicago, IL, USA, 2021, pp. 233-240 (Year: 2021).*

M. El Kharbili, et. al., "CoReL: Policy-Based and Model-Driven Regulatory Compliance Management," 2011 IEEE 15th International Enterprise Distributed Object Computing Conference, Helsinki, Finland, 2011, pp. 247-256 (Year: 2011).*

Zhong et al., "Aligning Knowledge and Text Embeddings by Entity Descriptions", Proceedings of the 2015 Conference on Empirical Methods in Natural Language Processing, pp. 267-272, Lisbon, Portugal, Sep. 2015, (6 pages).

Qu et al., "Weakly-supervised Knowledge Graph Alignment with Adversarial Learning", Montreal Institute for Learning Algorithms (MILA), arXiv:1907.03179v1, Jul. 2019, (11 pages).

Dragoni et al., "Combining NLP Approaches for Rule Extraction from Legal Documents", 1st Workshop on MIning and REasoning with Legal texts (MIREL 2016), Dec. 2016, Sophia Antipolis, France hal-01572443 (14 pages).

Wyner et al., "On Rule Extraction from Regulations", Frontiers in Artificial Intelligence and Applications, vol. 235: Legal Knowledge and Information Systems, pp. 113-122, DOI 10.3233/978-1-60750-981-3-113, (10 pages).

Nair et al., "Towards Automated Extraction of Business Constraints from Unstructured Regulatory Text", Proceedings of the 27th International Conference on Computational Linguistics: System Demonstrations, pp. 157-160, Santa Fe, New Mexico, Aug. 2018, (4 pages).

Spinosa et al., "NLP-based Metadata Extraction for Legal Text Consolidation", Proceedings of the 12th International Conference on Artificial Intelligence and Law, Barcelona, Spain, Jun. 2009, DOI: 10.1145/1568234.1568240 (10 pages).

Bonterra. "Social Solutions", https://web.archive.org/web/20210120213531/https://www.socialsolutions.com/software/apricot-360/, Jan. 20, 2021, 9 pages.

Deloitte. Get out of your own way—Unleashing productivity, Building the Lucky Country: Business imperatives for a prosperous Australia series, Mar. 26, 2015, 8 pages, Data retrieved from https://www2.deloitte.com/au/en/pages/building-lucky-country/articles/get-out-of-your-own-way.html.

Github. "About LexNLP", retrieved from web https://web.archive.org/web/20210921030649/https://lexpredict-lexnlp.readthedocs.io/en/latest/about.html, Sep. 21, 2021, 2 pages.

IBIS World. "Adoption & Child Welfare Services in the US", Industry Statistics—United States Nov. 26, 2021, 7 pages, https://web.archive.org/web/20220119190139/https://www.ibisworld.com/industry-statistics/market-size/adoption-child-welfare-services-united-states/.

IBM. "A safer and smarter return to the workplace", retrieved from web https://web.archive.org/web/20220123063217/https://www.IBM.com/watson/watson-works, Jan. 23, 2022, 8 pages.

IBM. "Government health and human services solutions", retrieved from web https://web.archive.org/web/20220116114753/https://www.ibm.com/watson-health/solutions/government-healthcare, Jan. 16, 2022, 6 pages.

IBM. "IBM Watson Care Manager", retrieved from web https://web.archive.org/web/20220125095928/https://www.ibm.com/products/watson-care-manager, Jan. 25, 2022, 8 pages.

ICF. "Publications Office of the European Union", European Commission, Study on the costs of compliance for the financial sector. Publications Office of the European Union, Jul. 2019, 372 pages, Data retrieved from https://op.europa.eu/en/publication-detail/-/publication/4b62e682-4e0f-11ea-aece-01aa75ed71a1.

Kiyavitskaya et al. "Automating the extraction of rights and obligations for regulatory compliance", In International Conference on Conceptual Modeling, 2008, pp. 154-168.

Kobayashi et al. "Top-Down RST Parsing Utilizing Granularity Levels in Documents", Proceedings of the AAAI Conference on Artificial Intelligence, Apr. 3, 2020, 8 pages, vol. 34 No. 05, https://ojs.aaai.org//index.php/AAAI/article/view/6321.

Ludwig et al. "Learning to Extract Action Descriptions from Narrative Text," In IEEE Transactions on Games, Mar. 2018, pp. 15-28, vol. 10, No. 1, doi: 10.1109/TCIAIG.2017.2657690.

Mani et al. "Five trends shaping the future of Medicaid", Mckinsey & Company, Mar. 29, 2019, 10 pages, https://web.archive.org/web/20210925213222/https://www.mckinsey.com/industries/healthcare-systems-and-services/our-insights/five-trends-shaping-the-future-of-medicaid.

Mohun et al., "Cracking the code: Rulemaking for humans and machines", OECD Working Papers on Public Governance, No. 42, OECD Publishing, Paris, Oct. 12, 2020, 110 pages, https://doi.org/10.1787/3afe6ba5-en.

No Author. "Digital government", retrieved from web https://web.archive.org/web/20211019112022/https://www.digital.govt.nz/digital-government/, Oct. 19, 2021, 2 pages.

No Author. "NHE Fact Sheet", CMS.gov, Jan. 7, 2022, 4 pages, https://web.archive.org/web/20220107011741/https://www.cms.gov/Research-Statistics-Data-and-Systems/Statistics-Trends-and-Reports/NationalHealthExpendData/NHE-Fact-Sheet.

No Author. "OpenFisca", retrieved from web https://web.archive.org/web/20210928104915/https://openfisca.org/en/, Sep. 28, 2021, 6 pages.

No Author. "Policy Basics: The Supplemental Nutrition Assistance Program (SNAP)", Center on Budget and policy priorities, Jun. 25, 2019, 10 pages, https://web.archive.org/web/20220120183903/https://www.cbpp.org/research/food-assistance/the-supplemental-nutrition-assistance-program-snap.

No Author. "SentenceTransformers Documentation", retrieved from web https://web.archive.org/web/20211202134853/https://www.sbert.net/index.html, Dec. 2, 2021, 8 pages.

No Author. "Value of a Families entitlement for best start tax credit", Best Start best_start_tax_credit_per_child, Oct. 21, 2021, 2 pages, https://web.archive.org/web/20211021064227/http://nz.openfisca.org/variables/best_start_tax_credit_per_child.

Rainey Rebecca. "Jobless claims reach 22 million over four weeks", Politico, Apr. 16, 2020, 6 pages, https://web.archive.org/web/20220123215900/https://www.politico.com/news/2020/04/16/coronavirus-unemployment-claims-numbers-190026.

Sapkota et al. Extracting meaningful entities from regulatory text: Towards automating regulatory compliance, In Requirements Engineering and Law (RELAW), Sep. 2012, pp. 29-32.

Venetis et al. "Recovering semantics of tables on the web", Proceedings of the VLDB Endowment, Jun. 1, 2011, pp. 528-538, vol. 4, Issue 9, DOI:https://doi.org/10.14778/2002938.2002939.

* cited by examiner

800

900

START — 902

ASSOCIATE SEMANTIC DATA EXTRACTED FROM A LAW, A POLICY, A REGULATION, OR A COMBINATION THEREOF WITH TEXT DATA, FROM THE ONE OR MORE DATA SOURCES, DESCRIBING AT LEAST A PORTION OF THE LAW, THE POLICY, THE REGULATION, OR A COMBINATION THEREOF — 904

END — 906

IDENTIFYING REGULATORY DATA CORRESPONDING TO EXECUTABLE RULES

BACKGROUND OF THE INVENTION

Field of the Invention

The present invention relates in general to computing systems, and more particularly to, various embodiments for identifying and correlating regulatory data with executable rules using a computing processor.

Description of the Related Art

Computing systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Due to the recent advancement of information technology and the growing popularity of the Internet, a vast amount of information is now available in digital form. Such availability of information has provided many opportunities. Digital and online information is an advantageous source of business intelligence that is crucial to an entity's survival and adaptability in a highly competitive environment. Also, many businesses and organizations, employing the use of computing systems and online data, must ensure operations, practices, and/or procedures are in compliance with general business protocols, corporate compliance, and/or legal regulations, policies, or requirements.

SUMMARY OF THE INVENTION

Various embodiments for identifying and correlating regulatory data with executable rules in a computing environment by a processor are provided. In one embodiment, by way of example only, a method for identifying regulatory data correlating with executable rules, again by a processor, is provided. A rule may be associated with one or more textual paragraphs extracted from a policy document that describes at least a portion of the rule.

In other embodiments, semantic data extracted from a law, a policy, a regulation, or a combination thereof may be associated with text data, from the one or more data sources, describing at least a portion of the law, the policy, the regulation, or a combination thereof.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
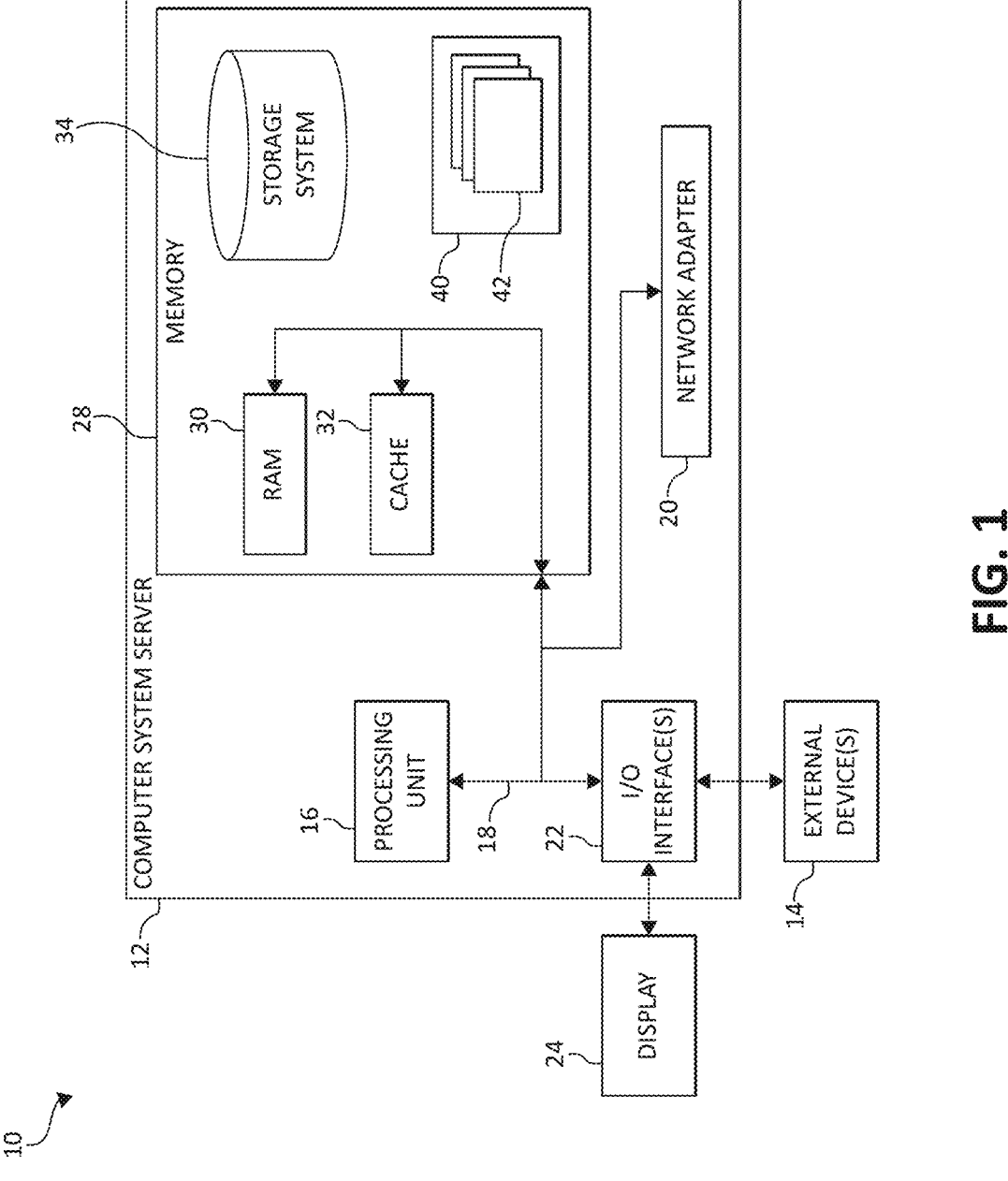
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of topics ranging from scientific, legal, educational, financial, travel, shopping and leisure activities, healthcare, and so forth. Many data-intensive applications require the extraction of information from data sources. The extraction of information may be obtained through a knowledge generation process that may include initial data collection among different sources, data normalization and aggregation, and final data extraction.

Moreover, entities (e.g., businesses, governments, organizations, academic institutions, etc.) may be subject to certain processes, policies, guidelines, rules, laws, and/or regulations relevant to the entities. Compliance with these processes, policies, guidelines, rules, laws, and/or regulations is critical and essential to ensure integrity of the company while also avoiding violations, fines, or legal punishment. For example, regulatory compliance management is a supreme matter of paramount importance to organizations as new regulations emerge on an on-going basis. In one aspect, regulatory compliance is an entity's adherence to laws, regulations, guidelines and specifications relevant to its purpose or business. These enterprises/entities often require human interaction with various skills and expertise (e.g., a subject matter expert (SME)) to support compliance across the enterprise.

Moreover, to help with regulatory compliance, governments and business are automating policy in the form of coded rules (e.g., to check a citizen's eligibility to specific benefits they may be entitled to. For example, a "Rules as Code" (RaC) is an initiative that envisages "an official version of rules (e.g., laws and regulations) in a machine-consumable form, which allows rules to be understood and actioned by computer systems in a consistent way. It forms part of a broad movement towards digital government and has garnered broad public-sector interest. A recent OECD report on Rules as Code identifies ways to tackle this, such as brings legislative drafters, policy analysts and software developers together to co-produce policy and machine-consumable versions of rules or using AI and automation to shorten the route from policy to code.

Organizations that automate policy have a responsibility to tackle 'translation of intent' errors from legislation to policy, to business requirements, to executable rules and code, but often the link between the implementation (executable rules/code) and the original policy text where it was originated is missing. Thus, given the vast amount of text data and the pace at which regulation documents change, various embodiments are provided herein to identify regulatory data correlating with executable rules. Semantic data extracted from a law, a policy, a regulation, or a combination thereof may be associated with text data, from the one or more data sources, describing at least a portion of the law, the policy, the regulation, or a combination thereof.

In some implementations, the present invention provides for aligning and correlating existing policy rules (code) to specific sections/paragraphs in policy and legislative text. The present invention also provides for a mapping between rules to text and addresses the multi-translation problem in the legislative domain and ensuring the following.

1) The present invention provides for rules and dependencies to other rules to be learned and understood and can be corrected by machine learning operation. It should be noted that a section/paragraph could translate to multiple rules, and a rule can depend on other rules from other sections in the policy or even across policy manuals and/or legislation acts. 2) The present invention provides for supporting and detecting legislative errors such as, for example, policy sections missing in the code. 3) The present invention provides for supporting, maintaining, and updating rules when policy changes are introduced. In particular making more efficient and faster the process of doing those updates, so eligibility rules reflect accurately the latest policy intent. 4) The present invention provides for supporting and identifying rule hierarchy, duplicated rules and attributes or definitions. 5) The present invention provides for supporting and reusability by identifying which rules already exists when new policy is introduced. That is, existent rules that are similar to parts of a new policy text, i.e., with the same definition or with subtle differences, for example the implementation of residency rules across two states or between different policies for cash assistance and child benefit may be very similar. 5) The present invention provides for correlating and aligning rules to text also supports the generation of training data for machine learning operations that support entity annotation or rule extraction.

As such, the present invention provides for identifying regulatory data correlating with executable rules in a computing environment. In one aspect, legislation, laws, policies, regulations, or a combination thereof may be extracted from one or more segments of text data from one or more data sources may be identified requiring an obligation to be performed by the entity. Semantic data extracted from a law, a policy, a regulation, or a combination thereof may be associated with text data, from the one or more data sources, describing at least a portion of the law, the policy, the regulation, or a combination thereof. In one aspect, the "obligation" may represent legal requirements (including laws, policies, regulations, mandates, responsibilities, or a combination thereof). Said differently, the obligation targets/content extraction component may perform a perceptron algorithm to extract entity classes. It should be noted that an "obligation" represents legal requirements (including laws, policies, regulations, mandates, responsibilities, or a combination thereof).

In one aspect, a one or more entities may be extracted using one or more natural language processing (NLP) and/or named-entity recognition (NER) operations. A NER operation may be a subtask of information extraction that may locate and classify named entities in text into pre-defined categories such as, for example, persons, entities, organizations, and locations. A set of sentences with an obligation-like content may be determined (e.g., computed) using the extraction operation and one or more filtering operations applied to the content of semantic roles from the sentences. A machine learning (ML) classifier may be used to determine if a selected segment/clause of the ingested text data is an obligation/requirement.

In one aspect, as used herein, the term regulation may be a document written in natural language containing a set of legislation, laws, policies, regulations, regulatory targets, entities, and requirements specifying obligations, obligation targets, constraints and preferences pertaining to the desired structure and behavior of an enterprise. A regulation may specify the domain elements it applies to. For example, regulations may be a law (e.g., a health care law, environmental protection laws, aviation laws, etc.), a standardization document, a contract, and the like. Also, as used herein, the type of entities of interest include for example, "definitions" that are clauses/text segments that define/represent stakeholders or specific equipment. That is, "definitions" may be clauses within legal text that define specific actors, entities, and/or stakeholders governed by the text (e.g., the legal text such as, for example, a rule/law/policy of a particular jurisdiction). Definition targets may be the definition entity and definition content may be clauses/text segments that describe the target. Also, an "obligation" may be a clause that represents legal requirements. An obligation target is a legislative target of a specific clause. Obligation content may be a requirement that applies to a target.

Also, the term "domain" is a term intended to have its ordinary meaning. In addition, the term "domain" can include an area of expertise for a system or a collection of material, information, content and/or other resources related to a particular subject or subjects. For example, a domain can refer to a regulatory, legal, policy, governmental, financial, healthcare, advertising, commerce, scientific, industrial, educational, medical, biomedical-specific information, or other area or information defined by a subject matter expert. A domain can refer to information related to any particular subject matter or a combination of selected subjects.

The term "ontology" is also a term intended to have its ordinary meaning. For example, an ontology may include information or content relevant to a domain of interest or content of a particular class or concept. Content can be any searchable information, for example, information distributed over a computer-accessible network, such as the Internet. A concept or topic can generally be classified into any of a number of content concepts or topics which may also include one or more sub-concepts and/or one or more sub-topics. Examples of concepts or topics may include, but are not limited to, regulatory compliance information, policy information, legal information, governmental information, business information, educational information, or any other information group. The ontology can be continuously updated with the information synchronized with the sources, adding information from the sources to the ontology as models, attributes of models, or associations between models within the ontology.

It should be noted as described herein, the term "intelligent" (or "cognition") may be relating to, being, or involving conscious intellectual activity such as, for example, thinking, reasoning, or remembering, that may be performed using a machine learning. In an additional aspect, intelligent or "intelligence" may be the mental process of knowing, including aspects such as awareness, perception, reasoning and judgment. A machine learning system may use artificial reasoning to interpret data from one or more data sources (e.g., sensor-based devices or other computing systems) and learn topics, concepts, judgment reasoning knowledge, and/ or processes that may be determined and/or derived by machine learning.

In general, as used herein, "optimize" may refer to and/or defined as "maximize," "minimize," "most likely," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" or "most likely" for a particular application, for example. In some implementations, an objective is to suggest a "best" combination of preprocessing operations ("preprocessors") and/or machine learning models/machine learning pipelines, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
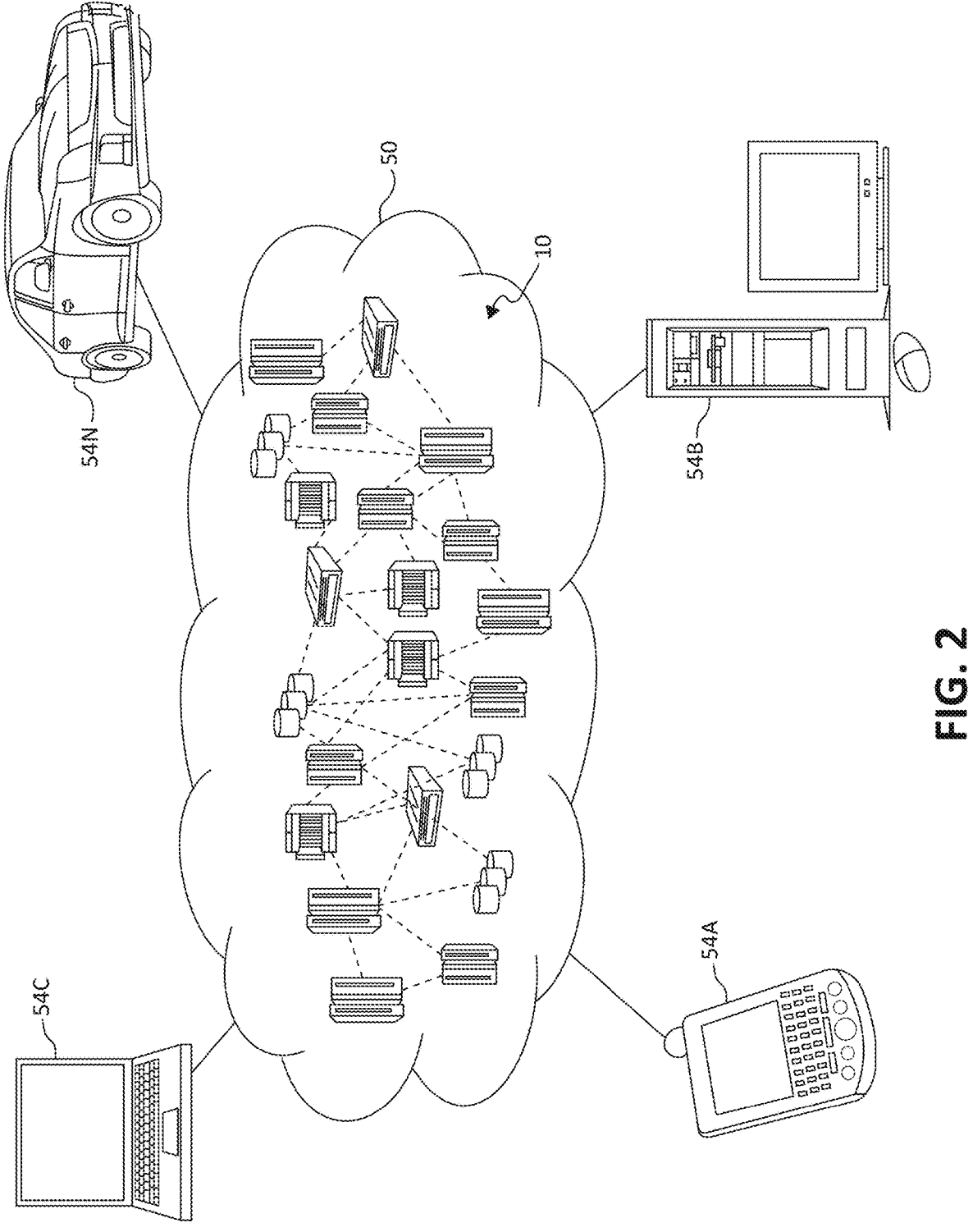
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
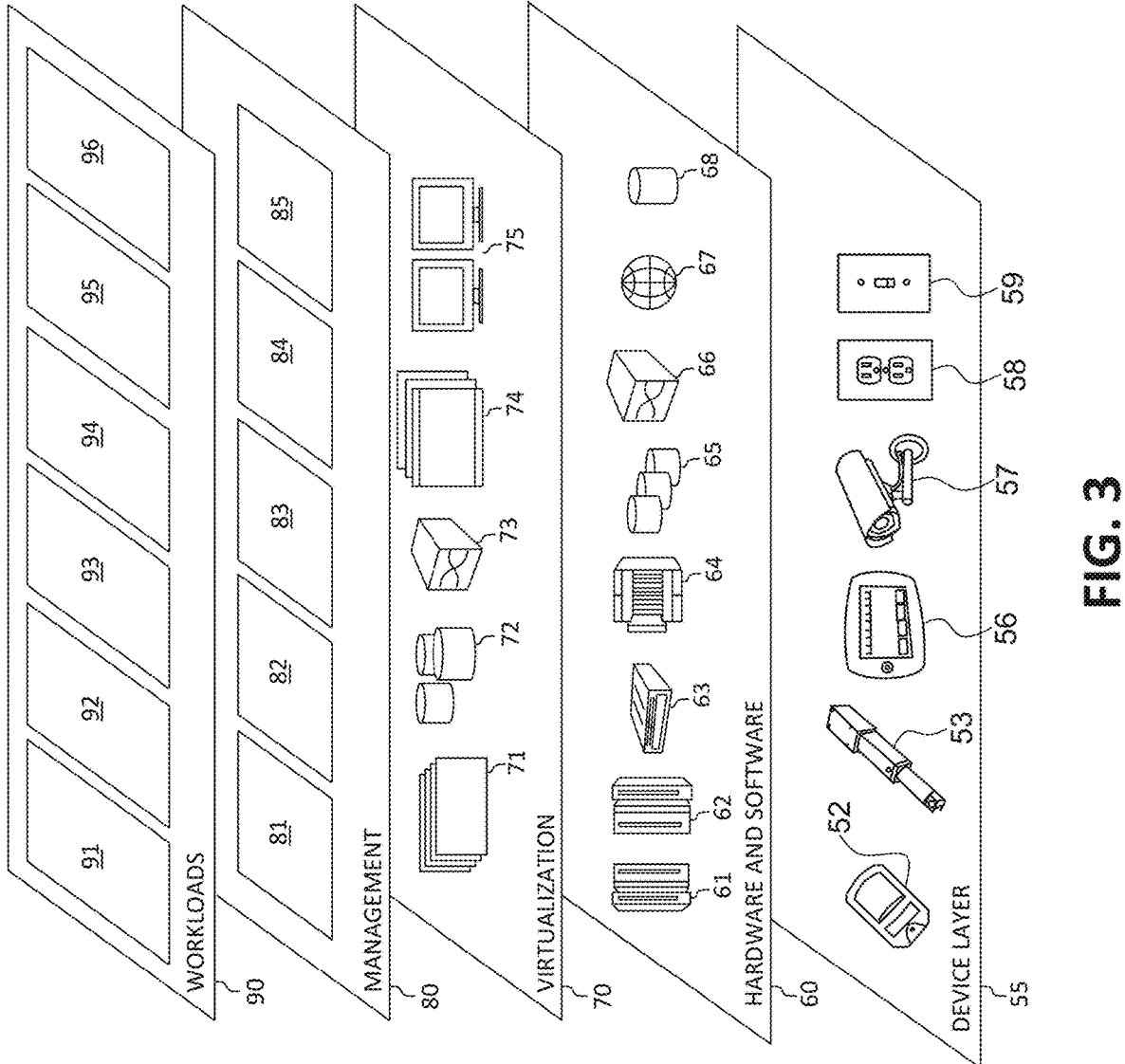
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for identifying and correlating regulatory data with executable rules. In addition, workloads and functions 96 for identifying and correlating regulatory data with executable rules may include such operations as analytics, entity and obligation analysis, and as will be further described, user and device management functions. One of ordinary skill in the art will appreciate that the workloads and functions 96 for identifying and correlating regulatory data with executable rules may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4:
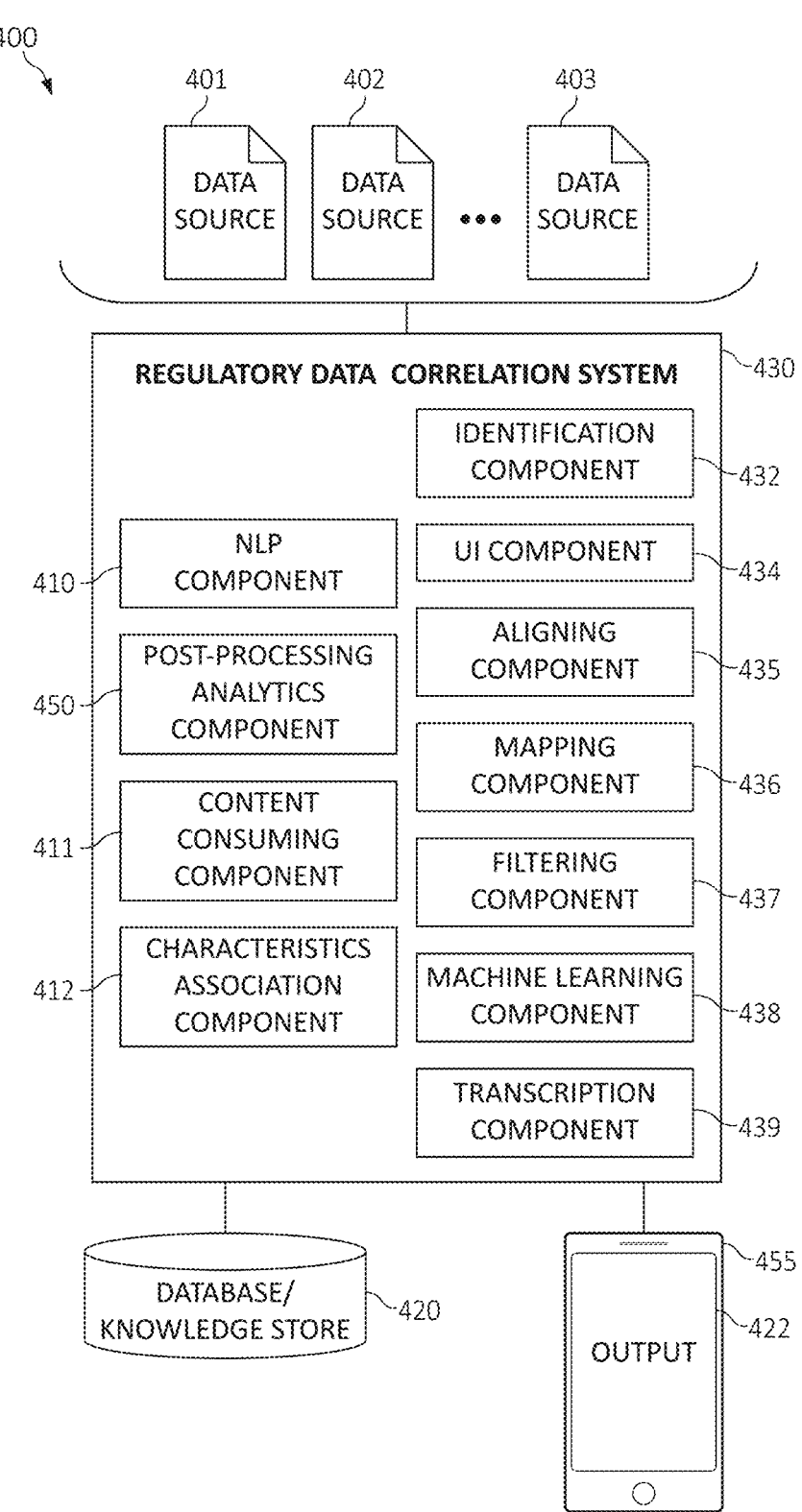
FIG. 4 is an additional block diagram depicting an exemplary functional relationship between various aspects of the present invention.

Turning now to FIG. 4, a block diagram of exemplary functionality 400 relating to identifying and correlating regulatory data with executable rules is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for extraction and summarization of decision methods and features in accordance with the present invention, such as those described in FIGS. 1-3. Many of the functional blocks 400 may execute as background processes on various components, either in distributed computing components, or on the user device, or elsewhere.

Multiple data sources 401-403 may be provided by one or more content contributors. The data sources 401-403 may be provided as a corpus or group of data sources defined and/or identified. The data sources 401-403 may include, but are not limited to, data sources relating to one or more documents, materials related to emails, books, scientific papers, online journals, journals, articles, drafts, audio data, video data, and/or other various documents or data sources capable of being published, displayed, interpreted, transcribed, or reduced to text data. The data sources 401-403 may be all of the same type, for example, pages or articles in a wiki or pages of a blog. Alternatively, the data sources 401-403 may be of different types, such as word documents, wikis, web pages, power points, printable document format, or any document capable of being analyzed by a natural language processing system.

In addition to text-based documents, other data sources such as audio, video or image sources may also be used wherein the audio, video or image sources may be pre-analyzed to extract or transcribe their content for natural language processing, such as converting from audio to text and/or image analysis. For example, a voice command issued by a content contributor may be detected by a voice-activated detection device 404 and record each voice command or communication. The recorded voice command/communication may then be transcribed into text data for natural language processing. As an additional example, a one or more of the data sources 401-402 may be an audio and/or video capturing device (e.g., a camera with a microphone) and may record an audio, video, or a combination thereof such as, for example, a webinar or meeting where cameras are installed in a room for broadcasting the meeting to remote locations where various intellectual property content contributors may collaborate remotely. The video data captured by a video capturing device may be analyzed and transcribed into images or text data for natural language processing.

The group of data sources 401-403 are consumed for a regulatory data correlation system such as, for example, regulatory data correlation system 430 using natural language processing (NLP) and artificial intelligence (AI) to provide processed content.

The data sources 401-403 may be analyzed by an NLP component 410 (and a transcription component 439 if necessary) to data mine or transcribe relevant information from the content of the data sources 401-403 (e.g., documents, emails, reports, notes, audio records, video recordings, live-streaming communications, etc.) in order to display the information in a more usable manner and/or provide the information in a more searchable manner. The NLP component 410 may be provided as a cloud service or as a local service.

The regulatory data correlation system 430 may include the NLP component 410, a content consuming component 411, a characteristic association component 412, and a post-processing component. The NLP component 410 may be associated with the consuming component 411. The content consuming component 411 may be used for inputting the data sources 401-403 and running NLP and AI tools against them, learning the content, such as by using the machine learning component 438. It should be noted that other components of FIG. 4 may also employ one or more NLP systems and the NLP component 410 is merely illustrated by way of example only of use of an NLP system. As the NLP component 410 (including the machine learning component 438) learns different sets of data, the characteristics association component 412 (or "intelligent characteristics association component") may use the artificial intelligence to make associations or links between data sources 401-403 by determining common concepts, methods, features, similar characteristics, and/or an underlying common topic.

"Intelligence" or "cognition" is the mental process of knowing, including aspects such as awareness, perception, reasoning and judgment. An AI system uses artificial reasoning to interpret the data sources 401-403 and extract their topics, ideas, or concepts. The learned decisions, decision elements, alternatives to the decision, alternative options/choices, decision criteria, concepts, suggestions, topics and subtopics of a domain of interest, obligations, regulations, laws, policies, legislative text, or other content may not be specifically named or mentioned in the data sources 401-403 and is derived or inferred by the AI interpretation.

The learned content of the data sources consumed by the NLP system may be merged into a database 420 (and/or knowledge store) or other data storage method of the consumed content with learned concepts, methods, and/or features of the data sources 401-403 providing association between the content referenced to the original data sources 401-403.

The database 420 may also work in conjunction with a transcription component 439, included in the regulatory data correlation system 430, to maintain a timestamped record of all interactions and contributions of each content contributor, decision, alternative, criteria, subject, topic, or idea. The database 420 may record and maintain the evolution of decisions, obligations, regulations, laws, policies, legislative text, alternatives, criteria, subjects, topics, ideas, or content discussed in the data sources 401-403. For example, the transcription component 439 may be used to transcribe a various types of data such as, for example, audio data or image/video data from data sources 401-403. For example, a voice command/communication captured by a voice-activated detection device and may be transcribed by the transcription component 439 into text data for natural language processing. As an additional example, the video data captured by a video capturing device may be analyzed and transcribed by the transcription component 439 into text data for natural language processing.

The database 420 may track, identify, and associate all communication threads, messages, transcripts, and the like of all data generated during all stages of the development or "life cycle" of the decisions, obligations, regulations, laws, policies, legislative text, alternatives, criteria, subjects, topics, or idea. The merging of the data into one database 420 (which may include a domain knowledge) allows the regulatory data correlation system 430 to act like a search engine, but instead of keyword searches, it will use an AI method of making cognitive associations between the data sources using the deduced concepts.

The regulatory data correlation system 430 may include a user interface ("UI") component 434 (e.g., an interactive graphical user interface "GUI") providing user interaction with the indexed content for mining and navigation and/or receiving one or more inputs/queries from a user. More specifically, the user interface component 434 may be in communication with a wireless communication device 455 (see also the PDA or cellular telephone 54A, the desktop computer 54B, the laptop computer 54C, and/or the automobile computer system 54N of FIG. 2.) for also providing user input for inputting data such as, for example, data sources 401-403 and also providing user interaction with a summary of the decision elements, alternatives, and/or criteria. The wireless communication device 455 may use the UI component 434 (e.g., GUI) for providing input of data and/or providing a query functionality such as, for example, interactive GUI functionality for enabling a user to enter a query in the GUI 422 relating to a domain of interest, topic, decision, alternative, criteria, summary of decisions, and/or an associated objective. For example, GUI 422 may display data relating to identifying and correlating regulatory data with executable rules.

The regulatory data correlation system 430 may also include an identification component 432. The identification component 432 may use data retrieved directly from one or more data sources or stored in the database 420 (or multiple immutable ledgers). The identification component 432 may identify segments, sentences, phrases, paragraphs, and topics that pertain to the one or more decisions, identify each decision element pertaining to the one or more decisions and the criteria of each of the one or more decisions, and/or identify and extract the criteria and one or more alternative suggestions relating to the one or more decisions.

The regulatory data correlation system 430 may also include an aligning component 435, a mapping component 436, and a filtering component 437.

The regulatory data correlation system 430 may use the aligning component 435 for aligning, grouping, clustering, and/or organizing decisions, obligations, regulations, laws, policies, legislative text, alternatives, criteria, subjects, topics, ideas, or content according to similar decisions, obligations, regulations, laws, policies, legislative text, alternatives, criteria, subjects, topics, ideas, or content. The aligning component 435 may align, group, cluster, and/or organize obligations, regulations, laws, policies, legislative text, alternatives, criteria, subjects, topics, ideas, or content together based on the context, similar sentiments, similar concepts, similar obligations, similar regulations, similar laws, similar policies, similar legislative text, similar alternatives, similar subjects, similar topics, similar ideas, similar content, and/or timestamp of the communications (e.g., audio/video data and/or text data having a timestamp indicating the communication occurs during the same time such as, for example, video data, audio data, notes, and/or text data of a meeting occurring at a selected time). The aligning component 435 may track the evolution of ideas, topics/subtopics, decisions, decision elements, alternatives, criteria, obligations, regulations, laws, policies, legislative text, and/or content that may be discussed in the documents or records of the database 420 (e.g., from the start of a legislative session until the end of the legislative session).

The regulatory data correlation system 430 may include a mapping component 436. The mapping component may map topics/subtopics, decisions, decision elements, alternatives, criteria, obligations, regulations, laws, policies, legislative text, and/or content with similar and/or alternative decisions, suggestions, obligations, regulations, laws, policies, legislative text, and choices.

The aligning component 435 may associate semantic data extracted from a law, a policy, a regulation, or a combination thereof with text data, from the one or more data sources, describing at least a portion of the law, the policy, the regulation, or a combination thereof.

In one aspect, once the NLP component 410 has carried out the linking of the data, the identification component 432 may mine the associated concepts, topics, obligations, regulations, laws, policies, legislative text, or similar characteristics from the database 420 of the consumed content to identify and correlate regulatory data with executable rules.

The regulatory data correlation system 430 may also include the filtering component 437 for filtering decisions, decision elements, alternative decisions, alternative suggestions, alternative choices, criteria, obligations, regulations, laws, policies, legislative text and/or summary of the plurality of the decision elements to a domain knowledge, which may be included in the database 420 and/or associated with the database 420.

In some embodiments, the regulatory data correlation system 430 may, using the aligning component 435, the filtering component 437, and the machine learning component 438, extract one or more entities from the text data and identify a portion of the semantic data as candidate semantic data based one or more entities.

In some embodiments, the regulatory data correlation system 430 may, using the aligning component 435, the filtering component 437, and the machine learning component 438, extract one or more logical structures from the text data; and identify a portion of the semantic data as candidate semantic data by comparing the one or more logical structures with the semantic data.

In some embodiments, the regulatory data correlation system 430 may, using the aligning component 435, the filtering component 437, and the machine learning component 438, generate a cluster of entities identified from the one or more segments of the text data.

In some embodiments, the regulatory data correlation system 430 may, using the aligning component 435, the filtering component 437, and the machine learning component 438, assign a matching score between the semantic data and the text data, where the score indicates a degree of corresponding relevance between the semantic data and the text data.

In some embodiments, the regulatory data correlation system 430 may, using the aligning component 435, the filtering component 437, and the machine learning component 438, convert the semantic data into a set of named entities, wherein each of the named entities are assigned a ranked score; identify selected portion of the text data based on the ranked score assigned to each of the named entities; and assign a confidence score to the selected portion of the text data indicating a degree of confidence the selected portion of the text data matches text data.

In some embodiments, the regulatory data correlation system 430 may initialize the machine learning component 438 to associate the semantic data of the law, the policy, the regulation, or a combination thereof with text data using a machine learning operation.

The machine learning component 438 may assign scores indicating the degree of relevance based completely on unsupervised learn. The given score is composed of two parts: $P(r|t)+P(t|r)$ where the first part $P(r|t)$ is the likelihood of rule r given text t and, the second part $P(t|r)$ is the likelihood of text t given rule r. The machine learning model used to estimate these likelihood values is a pretrained language models such as, for example, birectional Encoder Representations from Transformers ("BERT"), then is fine-tuned to maximize the given likelihood objective.

The machine learning component 438 may apply and/or one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

In one aspect, the domain knowledge may be an ontology of concepts representing a domain of knowledge. A thesaurus or ontology may be used as the domain knowledge and may also be used to identify semantic relationships between observed and/or unobserved variables. In one aspect, the term "domain" is a term intended to have its ordinary meaning. In addition, the term "domain" may include an area of expertise for a system or a collection of material, information, content and/or other resources related to a particular subject or subjects. A domain can refer to information related to any particular subject matter or a combination of selected subjects.

The term ontology is also a term intended to have its ordinary meaning. In one aspect, the term ontology in its broadest sense may include anything that can be modeled as an ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Additionally, the domain knowledge may include one or more external resources such as, for example, links to one or more Internet domains, webpages, and the like. For example, text data may be hyperlinked to a webpage that may describe, explain, or provide additional information relating to the text data. Thus, a summary may be enhanced via links to external resources that further explain, instruct, illustrate, provide context, and/or additional information to support a decision, alternative suggestion, alternative choice, criteria, obligations, regulations, laws, policies, legislative text, alternatives, criteria, subjects, topics, ideas, and/or content.

In one aspect, the regulatory data correlation system 430 may perform one or more various types of calculations or computations. The calculation or computation operations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.). It should be noted that each of the components of the regulatory data correlation system 430 may be individual components and/or separate components of the regulatory data correlation system 430.

Figure 5:
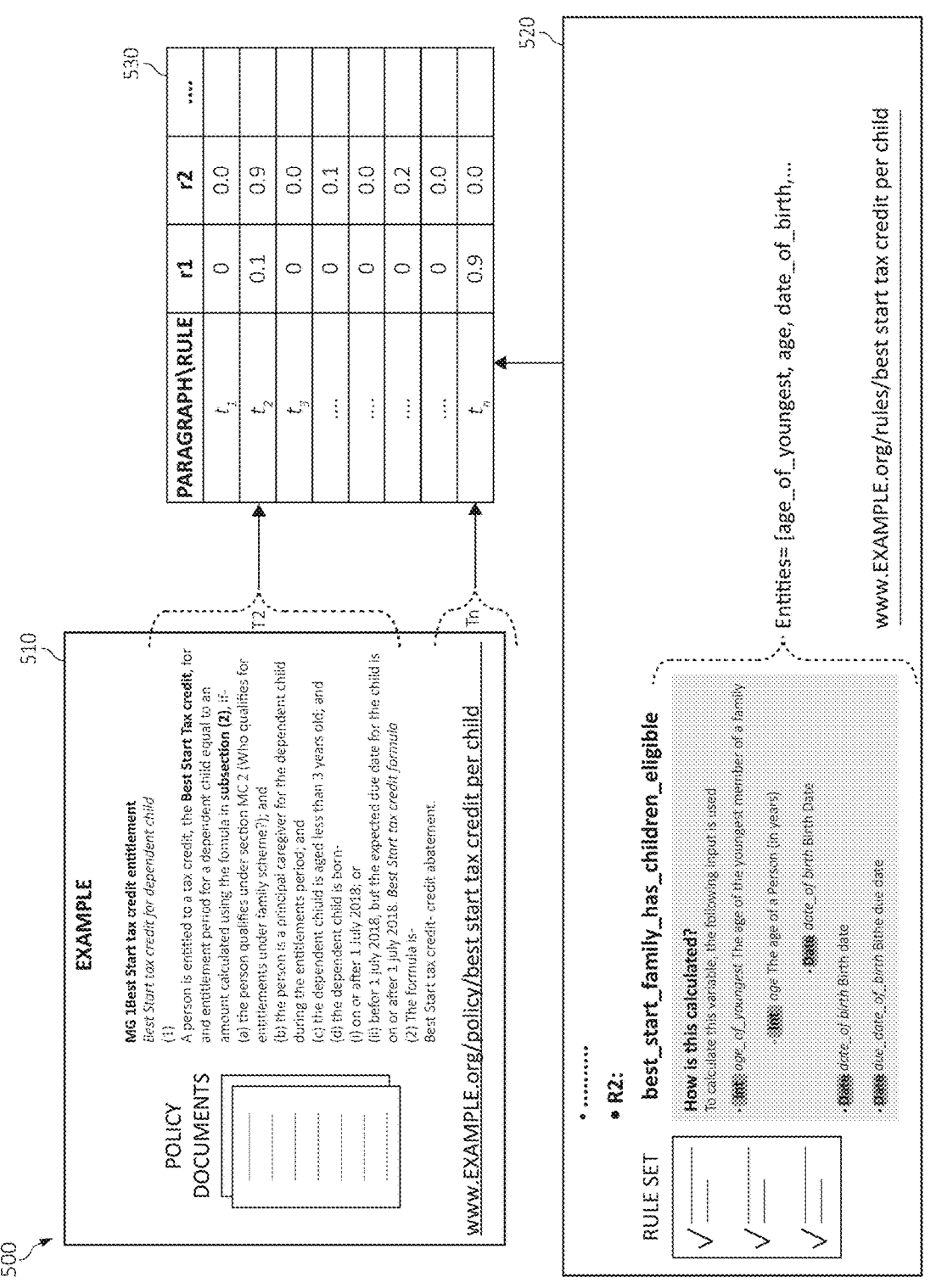
FIG. 5 is block diagram depicting exemplary operations for identifying and correlating regulatory data with executable rules in which aspects of the present invention may be realized.

For further explanation, FIG. 5 is block diagram depicting exemplary operations for identifying and correlating regulatory data with executable rules in which aspects of the present invention may be realized. In one aspect, one or more of the components, modules, services, applications, and/or functions described in FIGS. 1-4 may be used in FIG. 5. For example, computer system/server 12 of FIG. 1, incorporating processing unit 16, may be used to perform various computational, data processing and other functionality described in FIG. 5.

For example, a policy document 510 (e.g., policy documents from one or more data sources) and a rule document 520 (e.g., a set of rules, laws, or regulations from one or more data sources) may be analyzed and text data ("T" such as, for example, $T_1$, $T_2$, and $T_n$) may be ingested. One or more segments of text data may be extracted from the policy document 510 and the legislation document 520. Each entity within the regulatory text (e.g., the legislation document 402) may be identified and extracted.

That is, a list of textual paragraphs extracted from the policy document 510 and the rule document 520, represented in a formal/executable format (including meta information about variables in the rule formulas), may be extracted and compiled.

Each rule may be aligned, correlated, and associated to one or more relevant textual paragraphs, from the policy document 510, that best describes part of each of rules or the entire rule(s) from the rule document 520.

Also, each of the named entities from text data may be identified and extracted from the policy document 510 and the rule document 520 and uses those name entities to obtain the candidate rules from the rule document 520 that have high overlapping entities with the texts from the policy document 510.

In some embodiments, each of the logical structure may be extracted from the texts from the policy document 510 and the rule document 520 and uses the logical structure to compare to the rule logical structure from the policy document 510 to obtain the candidate rules that have similar structures from the rule document 520. Using the extracted entities and logical structures, the rules, paragraphs, and candidate rules/paragraphs for each paragraph/rule may be used as input and outputs a matching score table 530 between every rule (e.g., $r_1$, $r_2$, and $r_n$) extracted from the rule document 520 and paragraphs such as, for example, $T_1$, $T_2$, and $T_n$ that are extracted from the policy document 510.

In order to determine the matching scores (e.g., paragraph-rule matching scores) to correlate semantic data (e.g., a paragraph of text of a policy) to rule data, the determination may be performed as follows. In one implementations, for a given a set of rules (e.g., legislation rules, policies, regulations, etc.), R=$r_1$, $r_2$, $r_n$, and a set of texts T=$T_1$, $T_2$, . . . , $T_n$ (e.g., text paragraph in legislation policy texts) identify and locate the most optimal, best, or closest alignment of rules to texts, i.e., for each rule R finds the best matching texts T, as depicted in the matching score table 530.

Those of the paragraphs/segment data (e.g., "best start tax credit") having a closest matching or "optimal" or "best" matching score such as, for example, $T_1$, $T_2$, and $T_n$, may be learned using machine learning operations. For example, the machine learning operations learns and identifies that paragraph T2 from the policy document 510 has a most "optimal" or highest matching score that correlates to $r_2$ extracted from the rule document 520, but has a lowest matching score that correlates to $r_1$ extracted from the rule document 520. Also, by way of example only, the machine learning operations learns and identifies that paragraph Tn from the policy document 510 has a most "optimal" or highest matching score that correlates to $r_1$ extracted from the rule document 520, but has a lowest matching score that correlates to $r_2$ extracted from the rule document 520

Thus, the formal rules from the rule document 520 may be aligned to the text they refer to from the policy document 510 using a machine learning operation to understand each of the rule's dependencies to other rules, evidence or input data, code and rate tables, temporality and eligibility constrains and/or determinations That is, the formal rules from the rule document 520 may be aligned to the text they refer to from the policy document 510 using a machine learning operation to understand each of the rule's dependencies to other (including alternative or similar) decisions, obligations, regulations, laws, policies, legislative text, alternatives, criteria, subjects, topics, ideas, or content.

Figure 6:
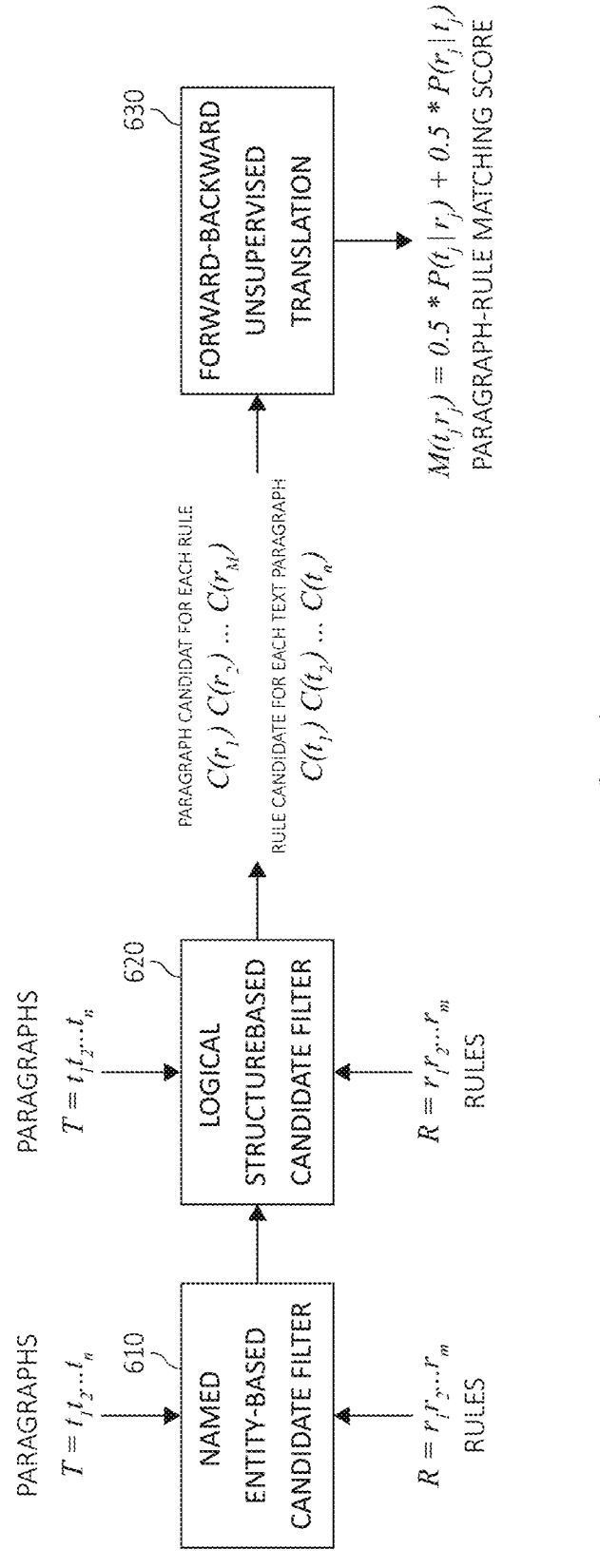
FIG. 6 is block diagram depicting an exemplary operations and workflow for identifying and correlating regulatory data with executable rules in which aspects of the present invention may be realized.

Turning now to FIGS. 6, block/flow diagram 600 is depicting for identifying and correlating regulatory data with executable rules in which aspects of the present invention may be realized. In one aspect, one or more of the components, modules, services, applications, and/or functions described in FIGS. 1-5 may be used in FIG. 6. For example, computer system/server 12 of FIG. 1, incorporating processing unit 16, may be used to perform various computational, data processing and other functionality described in FIG. 5.

In one implementation, at block 610, an entity-based candidate may be filtered. For example, for filtering the entity based candidate, step 1), a rule R may be converted into a set of named entities $S=\{E_1, E_2, \ldots, E_n\}$. Each named entity S may be associated to a score (e.g., a real number such as, for example, in range of [0, 1] that indicates it's a level or degree of importance (ranking). A set of entities S may be used to re-identify one or more paragraphs of text from a policy document that may correspond to the rule R. Each paragraph of text P is associated to a score (e.g., a real number in range [0, 1]) that indicates the confidence that P corresponds to the rule R.

In some implementations, the logical structure of the rule R may be derived from the set of entities S, as in block 620. A paragraph candidate (C) (e.g., $C(r_1)$, $C(r_2)$, and $C(r_n)$) and a rule candidate (C) (e.g., $C(T_1)$, $C(T_2)$, and $C(T_n)$) may be derived from the set of entities S, as in block 620. As depicted in block 630, a forward-backward unsupervised translation operation may be performed and generated a paragraph-rule matching score (e.g., $M(t_j r_1)=0.5*P(T_j|r_j)+0.5*P(r_j|T_j)$).

Thus, candidate filtering operation 610 and 620 are used to create smaller matching candidates for each rule or paragraph and the forward-backward unsupervised translation operation is used to estimate the matching score $M(t_j r_1)$ via a machine learning operation.

For converting a rule in a set of named entities in step 1, a block 610, the following operations may be performed. In some implementations, a rule R may be converted into a set of named entities. The rule R may have a textual description such as, for example: extract named entities from the textual description one or more operations. The rule R may have conditions and variables have "expressive" names, for example "isCitizenOf", "hasAge", "person.name", "person-Address", "income", etc. and conditions/variables names may be converted into entities by mapping them to one or more standard vocabularies and/or knowledge graphs. The rule R may have variables that are bound to data/values and data/values may be used to infer named entities:

Also, data may be in tabular format and one or more operations may be used for recovering semantics of tables such as, for example, tagging columns based on their values. In other implementations, the data may be in the form of XML/JSON/YAML or other "descriptive" formats. Thus, the data forms such as, for example, XML tags or JSON/YAML may be converted to attribute names to named entities (similar to "expressive" condition/variable names in the rule R). Also, semantics (ex. tags) may be re recovered using the values in the XML tags or JSON/YAML values.

In other implementations, a named entity expansion (with custom/standard vocabularies and/or knowledge graphs) may be used to expand the set of entities S. For example, wikification and/or other semantic matching and query expansion operations may be used. To associate a score with a named entity one or more types of operations may be used such as, for example, a frequency score, a confidence score of the named entity extractor, or an operation used to recover semantics from data/values, or a combination of these scores.

In some implementations, for mapping a set of named entities in step 2 to one or more paragraphs of text, the following operations may be performed. In some implementations, a set of named entities may be mapped to one or more paragraphs of texts. For example, a set of entities S may be the input set of named entities (derived from a rule R). Given a paragraph of text, a set of paragraph of text P of named entities from the paragraph may be extracted.

A similarity metric between S and P may be determined (e.g., using naïve metrics include Jaccard similarity between S and P, or F1 score between S (ground truth) and P (prediction)), where S is the set of entities extracted from rule R and P is the set of entities extracted from text T. Both F1 and Jaccard similarity are two metrics showing how similar two sets are.

The variable S may be converted into a vector VS using a pre-trained embedding model. The variable of the paragraph of text P maybe into a vector VP in the same embedding space. A similarity metric may be determined between VS and VP (e.g., such as, for example, a cosine similarity). A pre-trained embedding model may be used, for example, to convert variable S into the vector VS. There may need be an intermediate step, in which the variable S is converted into a sentence (text) and then use the embedding model to convert this sentence into the vector VS. This may be performed using the named entities in set of entities S.

In some implementations, the logical structure of the rule R from may be derived from the set of entities S, as in block 630, since it is known what entities correspond to conditions in the rule R or to variables in the rule R and the logical connectors in the rule R are known. Once the pairs of S and P are matched and the candidate paragraphs are identified, the "collective" matching/scoring (or in other words matching a set of named entities to all candidate paragraphs) may be applied to identify a subset of paragraphs (one or more) that are cumulatively define the rule. This can be implemented by hierarchical approach such as, for example, using a dependency tree or semantic-knowledge graph linking all S named entities and all P entities independently and then exploring "coverage/match" for each paragraph making sure the paragraphs are adding/contributing to the rules.

Figure 7:
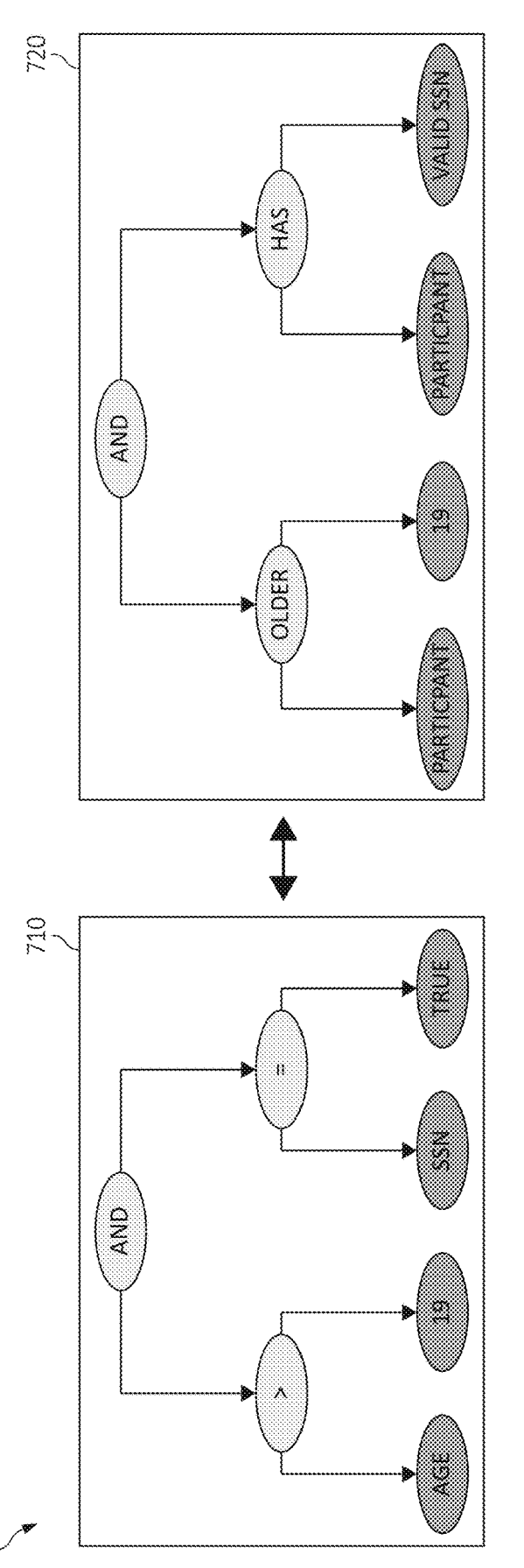
FIG. 7 is a diagram depicting an exemplary knowledge graph for identifying and correlating regulatory data with executable rules in which aspects of the present invention may be realized.

For further explanation, FIG. 7 is a diagram 700 depicting an exemplary knowledge graph for identifying and correlating regulatory data with executable rules (e.g., logical structure-based candidate filter 620 of FIG. 6) in which aspects of the present invention may be realized. In one aspect, one or more of the components, modules, services, applications, and/or functions described in FIGS. 1-6 may be used in FIG. 7.

As depicted, for filtering a logical structure-based candidate (block 620 of FIG. 6), a rule R may be converted into a knowledge graph tree Tr 710 representing the logical formula where nodes may be mathematical or logical operators such as, for example, and, or, greater, less, addition, subtraction etc. and nodes are variables or constants. For example, the formula of "Age>19 AND SSN=True" is represented as a tree in the knowledge graph tree Tr 710.

Next, a may be converted into a tree Ts where nodes are either detected logical operators or fragment of the texts. For example, the sentence "In order to be eligible, participant must be older than 19 years old and has a valid SSN" is represented as a tree in the knowledge graph tree Ts 720.

The knowledge graph tree Tr 710 may be compared with the knowledge graph tree Ts 720 using tree similarity metrics.

Figure 8:
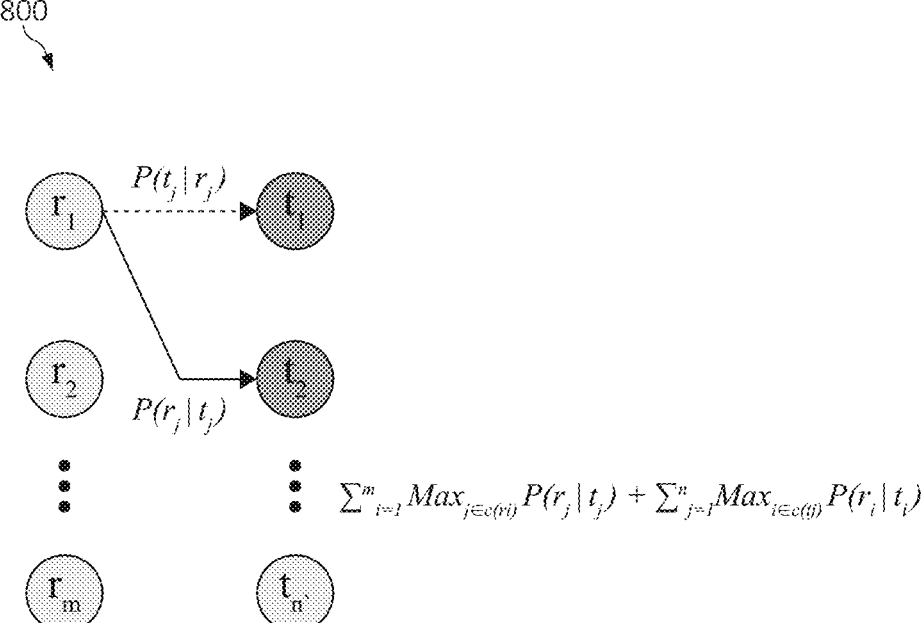
FIG. 8 is a diagram depicting an exemplary operations using forward and backwards translation for identifying and correlating regulatory data with executable rules in which aspects of the present invention may be realized.

For further explanation, FIG. 8 is a diagram depicting an exemplary operations using forward and backwards translation for identifying and correlating regulatory data with executable rules (e.g., forward-backward unsupervised translation operation 630 of FIG. 6) in which aspects of the present invention may be realized. In one aspect, one or more of the components, modules, services, applications, and/or functions described in FIGS. 1-6 may be used in FIG. 7.

In some implementations, for each rule R, a set of candidate texts C(r) may be identified or determined such that the candidate texts C(r) is likely (e.g., an increased probability) to include an optimal or best match (e.g., a maximized match). For each text T, set of candidate rules C(t) may be identified or determined such that the candidate rule C(t) is likely (e.g., an increased probability) to include an optimal or best match (e.g., a maximized match).

In some implementations, a language model may be used to estimate the probabilities $P(T|r)$ and $P(r|T)$, and the paragraph-rule matching score is maximized based on the following equation:

$$\Sigma_{i=1}{}^m \operatorname{Max}_{j \in c(r_i)} P(T_j|r_j) + \Sigma_{i-1}{}^m \operatorname{Max}_{j \in c(t_j)} P(r_j|T_j), \qquad (1).$$

Figure 9:
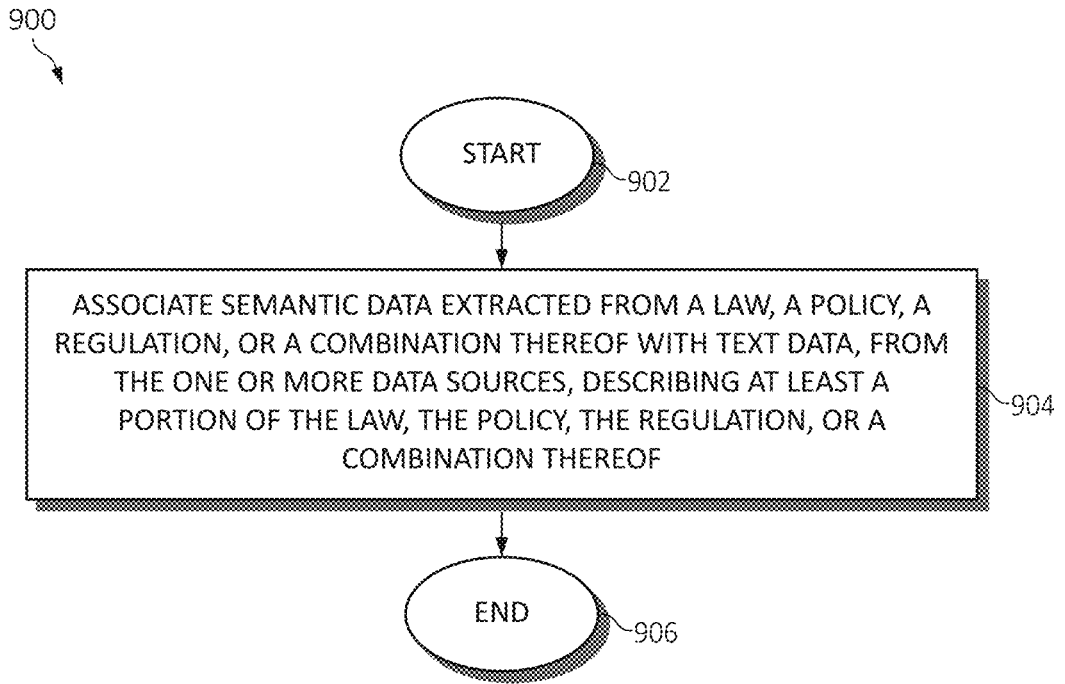
FIG. 9 is a flowchart diagram depicting an exemplary method for identifying and correlating regulatory data with executable rules by a processor, again in which aspects of the present invention may be realized.

Turning now to FIG. 9, a method 900 for identifying and correlating regulatory data with executable rules using a processor is depicted, in which various aspects of the illustrated embodiments may be implemented. The functionality 900 may be implemented as a method executed as instructions on a machine, where the instructions are included on at least one computer readable medium or one non-transitory machine-readable storage medium. The functionality 900 may start in block 902.

Semantic data extracted from a law, a policy, a regulation, or a combination thereof may be associated with text data, from the one or more data sources, describing at least a portion of the law, the policy, the regulation, or a combination thereof, as in block 904. Text data from the one or more data sources may be ingested upon processing the text data using a lexical analysis, parsing, extraction of concepts, semantic analysis, a machine learning operation, or a combination thereof. The functionality 900 may end, as in block 906.

In one aspect, in conjunction with and/or as part of at least one blocks of FIG. 9, the operations of 900 may include each of the following. The operations of 900 may ingest text data from one or more data sources upon processing the text data using a lexical analysis, parsing, extraction of concepts, semantic analysis, a machine learning operation, or a combination thereof. The operations of 900 may identify a defined scope of compliance required by the law, policy, regulation, or a combination thereof (e.g., legislative text).

Additionally, the operations of 900 may use natural language processing (NLP) to determine the semantic data and text data with obligation content. The semantic data and text data may be sentences and the obligation content requires an obligation to conform to the obligation, the law, the policy, the regulation, or a combination thereof, initialize a machine learning mechanism to learn, determine, or identify the obligation from the one or more segments of the text data, and/or generate a compliance corpus from training one or more machine learning models for managing regulatory compliance. The operations of 900 may define an obligation as a required action for compliance with a law, policy, regulation, or a combination thereof, a prohibition of conduct, behavior, or activity of the entity, a legal right, a constraint of the entity, or a combination thereof.

The operations of 900 may extract one or more entities from the text data and identify a portion of the semantic data as candidate semantic data based one or more entities. The operations of 900 may extract one or more logical structures from the text data; and identify a portion of the semantic data as candidate semantic data by comparing the one or more logical structures with the semantic data. That is, one or more segments of text data may be extracted from one or more data sources representing one or more objects describing compliance corpus and/or a compliance named entity of type organization expected to conform to an obligation, a law, policy, regulation, or a combination thereof The operations of 900 may generate a cluster of entities identified from the one or more segments of the text data. The operations of 900 may assign a matching score between the semantic data and the text data, wherein the score indicates a degree of corresponding relevance between the semantic data and the text data.

The operations of 900 may convert the semantic data into a set of named entities, wherein each of the named entities are assigned a ranked score; identify selected portion of the text data based on the ranked score assigned to each of the named entities; and assign a confidence score to the selected portion of the text data indicating a degree of confidence the selected portion of the text data matches text data.

The operations of 900 may initialize a machine learning mechanism to associate the semantic data of the law, the policy, the regulation, or a combination thereof with text data using a machine learning operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method, comprising:

extracting, using natural language processing associated with a neural network, a first set of entities from one or more textual paragraphs associated with a natural language policy document;

converting one or more executable rules, associated with a rule document, into a second set of entities, wherein each of the one or more executable rules is understandable and executable by a specific computer system;

assigning, each entity of the second set of entities, a ranked score corresponding to a level of importance of each entity of the second set of entities;

extracting, based on the first set of entities, one or more logical structures from the one or more textual paragraphs, wherein each of the one or more logical structures represents fragments of a respective textual paragraph of the one or more textual paragraphs;

extracting, based on the second set of entities, one or more rule logical structures from the one or more executable rules, wherein each of the one or more rule logical structures represents at least one of: a mathematical operator, a logical operator, a variable, or a constant;

comparing the one or more logical structures corresponding to the one or more textual paragraphs with the one or more rule logical structures corresponding to the one or more executable rules; and identifying, for each executable rule of the one or more executable rules, using the natural language processing, a textual paragraph of the one or more textual paragraphs, based on the assigning of the ranked score and the comparing of the one or more logical structures with the one or more rule logical structures, wherein the textual paragraph corresponds to a highest matching score, among the one or more textual paragraphs, that correlates to an executable rule of the one or more executable rules.

2. The method of claim 1, further comprising mapping, using a forward-backward translation operation, the one or more executable rules to the one or more textual paragraphs.

3. The method of claim 1, wherein the identifying of the textual paragraph of the one or more textual paragraphs further comprises:

assigning a set of matching scores between the one or more textual paragraphs and the one or more executable rules, wherein each matching score of the set of matching scores corresponds to a respective textual paragraph of the one or more textual paragraphs and a respective rule of the one or more executable rules, the set of matching scores includes the highest matching score, and the set of matching scores indicates a degree of corresponding relevance between the one or more textual paragraphs and the one or more executable rules.

4. The method of claim 1, further comprising assigning a confidence score to the textual paragraph of the one or more textual paragraphs, wherein the confidence score of the textual paragraph of the one or more textual paragraphs indicates a degree of confidence that the textual paragraph of the one or more textual paragraphs matches to the executable rule of the one or more executable rules.

5. A system, comprising:

one or more processors with executable instructions that when executed cause the system to:

extract, using natural language processing associated with a neural network, a first set of entities from one or more textual paragraphs associated with a natural language policy document;

convert one or more executable rules, associated with a rule document, into a second set of entities, wherein each of the one or more executable rules is understandable and executable by a specific computer system;

assign, each entity of the second set of entities, a ranked score corresponding to a level of importance of each entity of the second set of entities;

extract, based on the first set of entities, one or more logical structures from the one or more textual paragraphs, wherein each of the one or more logical structures represents fragments of a respective textual paragraph of the one or more textual paragraphs;

extract, based on the second set of entities, one or more rule logical structures from the one or more executable rules, wherein each of the one or more rule logical structures represents at least one of: a mathematical operator, a logical operator, a variable, or a constant;

compare the one or more logical structures corresponding to the one or more textual paragraphs with the one or more rule logical structures corresponding to the one or more executable rules; and identify, for each executable rule of the one or more executable rules, using the natural language processing, a textual paragraph of the one or more textual paragraphs, based on the assignment of the ranked score and the comparison of the one or more logical structures with the one or more rule logical structures, wherein the textual paragraph corresponds to a highest matching score, among the one or more textual paragraphs, that correlates to an executable rule of the one or more executable rules.

6. The system of claim 5, wherein the executable instructions when executed further cause the system to map, using a forward-backward translation operation, the one or more executable rules to the one or more textual paragraphs.

7. The system of claim 5, wherein the identification of the textual paragraph of the one or more textual paragraphs further comprises:

assign a set of matching scores between the one or more textual paragraphs and the one or more executable rules, wherein each matching score of the set of matching scores corresponds to a respective textual paragraph of the one or more textual paragraphs and a respective rule of the one or more executable rules, the set of matching scores includes the highest matching score, and the set of matching scores indicates a degree of corresponding relevance between the one or more textual paragraphs and the one or more executable rules.

8. The system of claim 5, wherein the executable instructions when executed further cause the system to assign a confidence score to the textual paragraph of the one or more textual paragraphs, wherein the confidence score of the textual paragraph of the one or more textual paragraphs indicates a degree of confidence that the textual paragraph of the one or more textual paragraphs matches to the executable rule of the one or more executable rules.

9. A computer program product, comprising:

one or more computer readable storage media; and program instructions collectively stored on the one or more computer readable storage media to perform operations comprising:

extracting, using natural language processing associated with a neural network, a first set of entities from one or more textual paragraphs associated with a natural language policy document;

converting one or more executable rules, associated with a rule document, into a second set of entities, wherein each of the one or more executable rules is understandable and executable by a specific computer system;

assigning, each entity of the second set of entities, a ranked score corresponding to a level of importance of each entity of the second set of entities;

extracting, based on the first set of entities, one or more logical structures from the one or more textual paragraphs, wherein each of the one or more logical structures represents fragments of a respective textual paragraph of the one or more textual paragraphs;

extracting, based on the second set of entities, one or more rule logical structures from the one or more executable rules, wherein each of the one or more rule logical structures represents at least one of: a mathematical operator, a logical operator, a variable, or a constant;

comparing the one or more logical structures corresponding to the one or more textual paragraphs with the one or more rule logical structures corresponding to the one or more executable rules; and identifying, for each executable rule of the one or more executable rules, using the natural language processing, a textual paragraph of the one or more textual paragraphs, based on the assigning of the ranked score and the comparing of the one or more logical structures with the one or more rule logical structures, wherein the textual paragraph corresponds to a highest matching score, among the one or more textual paragraphs, that correlates to an executable rule of the one or more executable rules.

10. The computer program product of claim 9, wherein the program instructions stored on the one or more computer readable storage media perform the operations further comprising: mapping, using a forward-backward translation operation, the one or more executable rules to the one or more textual paragraphs.

11. The computer program product of claim 9, wherein the identifying of the textual paragraph of the one or more textual paragraphs further comprises:

assigning a set of matching scores between the one or more textual paragraphs and the one or more executable rules, wherein each matching score of the set of matching scores corresponds to a respective textual paragraph of the one or more textual paragraphs and a respective rule of the one or more executable rules, the set of matching scores includes the highest matching score, and the set of matching scores indicates a degree of corresponding relevance between the one or more textual paragraphs and the one or more executable rules.

12. The computer program product of claim 9, wherein the program instructions stored on the one or more computer readable storage media perform the operations further comprising assigning a confidence score to the textual paragraph of the one or more textual paragraphs, wherein the confidence score of the textual paragraph of the one or more textual paragraphs indicates a degree of confidence that the textual paragraph of the one or more textual paragraphs matches to the executable rule of the one or more executable rules.

* * * * *